United States Patent
Keren et al.

(10) Patent No.: US 12,323,087 B2
(45) Date of Patent: Jun. 3, 2025

(54) ANCHORING STRUCTURE FOR GROUND MOUNTING OF SOLAR PHOTOVOLTAIC SYSTEM

(71) Applicant: Watershed Geosynthetics LLC, Alpharetta, GA (US)

(72) Inventors: Benjamin Keren, Yuvalim (IL); Neta Reef, Beit Elazary (IL); S. Kyle Ehman, Milton, GA (US); Michael R. Ayers, Johns Creek, GA (US)

(73) Assignee: Watershed Geosynthetics LLC, Alpharetta, GA (US)

( * ) Notice: Subject to any disclaimer, the term of this patent is extended or adjusted under 35 U.S.C. 154(b) by 0 days.

(21) Appl. No.: 18/223,408

(22) Filed: Jul. 18, 2023

(65) Prior Publication Data

US 2023/0412115 A1    Dec. 21, 2023

Related U.S. Application Data

(63) Continuation-in-part of application No. PCT/US2022/025886, filed on Apr. 22, 2022, and a
(Continued)

(30) Foreign Application Priority Data

Jul. 18, 2017    (IL) .......................................... 253535

(51) Int. Cl.
*H02S 20/10*    (2014.01)
*E02D 17/20*    (2006.01)

(52) U.S. Cl.
CPC ............ *H02S 20/10* (2014.12); *E02D 17/202* (2013.01); *E02D 2600/30* (2013.01)

(58) Field of Classification Search
CPC ... E02D 2600/30; E02D 17/202; H02S 20/10; H02S 30/10; F24S 25/61; F24S 25/617; F24S 25/67; F16B 5/123
See application file for complete search history.

(56) References Cited

U.S. PATENT DOCUMENTS 3,512,319 A    5/1970    Piacentino
4,044,513 A    8/1977    Deike
(Continued)

FOREIGN PATENT DOCUMENTS

DE    102009005823 A1 *    7/2010    ......... E04D 13/1643
DE    102011016697 B3          7/2012
(Continued)

OTHER PUBLICATIONS

Summary of the Preliminary Search conducted before Israeli Patent Application No. 253535.
(Continued)

*Primary Examiner* — Patrick D Hawn
(74) *Attorney, Agent, or Firm* — Baker Donelson; Carl M. Davis, II (57) ABSTRACT

A ground mounting system for supporting solar photovoltaic panels on a planar or inclined having an array of soil fasteners in spaced-relation driven through a geomembrane overlying a greenfield ground site and connected with a respective one of a plurality adapting regulating apparatus to racks to which solar photovoltaic panels mount securely, which soil fasteners communicate compressive loads to the ground while resisting tension forces from wind uplift on the planar field of solar photovoltaic panels.

25 Claims, 11 Drawing Sheets

Related U.S. Application Data continuation-in-part of application No. 16/630,671, filed as application No. PCT/IL2018/050597 on Jun. 2, 2018, now Pat. No. 11,705,854.

(60) Provisional application No. 63/178,511, filed on Apr. 22, 2021, provisional application No. 62/532,360, filed on Jul. 14, 2017.

(56) References Cited

U.S. PATENT DOCUMENTS

| | | | |
|---|---|---|---|
| 5,951,202 | A | 9/1999 | Brown |
| 7,789,594 | B2 | 9/2010 | Stahm |
| 7,862,259 | B2 | 1/2011 | Carpenter |
| 8,468,755 | B2 | 6/2013 | Zuritis |
| 8,544,221 | B2 | 10/2013 | Marley |
| 8,622,654 | B2 | 1/2014 | Oliveira |
| 8,651,771 | B2 | 2/2014 | Schneider |
| 9,611,609 | B2 | 4/2017 | Kelleher |
| 10,077,893 | B1 | 9/2018 | Abraham |
| 10,992,250 | B2 | 4/2021 | Ayers |
| 11,022,343 | B2 * | 6/2021 | Tomlinson ............ F24S 25/617 |
| 11,705,854 | B2 | 7/2023 | Keren |
| 2002/0094238 | A1 | 7/2002 | Schibi |
| 2009/0175687 | A1 | 7/2009 | Oliveira |
| 2010/0139649 | A1 | 6/2010 | Almy |
| 2010/0319272 | A1 | 12/2010 | Kellner |
| 2011/0099923 | A1 * | 5/2011 | Ventura ................ F24S 30/452 136/246 |
| 2011/0121144 | A1 | 5/2011 | Berbegal Pastor |
| 2011/0163051 | A1 | 7/2011 | Horanek |
| 2011/0194900 | A1 * | 8/2011 | French, Sr. ........... F24S 25/617 104/106 |
| 2011/0277296 | A1 * | 11/2011 | Ramos .................. F24S 25/65 29/428 |
| 2012/0031468 | A1 | 2/2012 | Boise |
| 2012/0152316 | A1 | 6/2012 | Fischer |
| 2013/0232757 | A1 | 9/2013 | Ramos |
| 2013/0284239 | A1 | 10/2013 | Mun |
| 2014/0190556 | A1 | 7/2014 | Conger |
| 2015/0292228 | A1 | 10/2015 | Bardelli |
| 2016/0186403 | A1 | 6/2016 | Tomchesson |
| 2018/0269826 | A1 | 9/2018 | Urrutia |
| 2018/0366600 | A1 * | 12/2018 | Ayers ..................... H02S 20/10 |
| 2018/0367093 | A1 | 12/2018 | Ayers |
| 2019/0158013 | A1 | 5/2019 | Boguess |
| 2019/0222162 | A1 | 7/2019 | Ehman |
| 2020/0032831 | A1 | 1/2020 | Almy |
| 2020/0366234 | A1 | 11/2020 | Ayers |
| 2021/0013826 | A1 | 1/2021 | Ayers |
| 2021/0091708 | A1 | 3/2021 | Keren |
| 2021/0115642 | A1 | 4/2021 | Almy |

FOREIGN PATENT DOCUMENTS

| | | | | |
|---|---|---|---|---|
| EP | 3839148 | A1 * | 6/2021 | ........... E02D 17/202 |
| FR | 2615542 | A1 * | 11/1988 | ........... E02D 17/202 |
| FR | 2979926 | A1 * | 3/2013 | ............. E02D 17/20 |
| JP | 2013079516 | A * | 5/2013 | |
| JP | 2013130011 | A | 7/2013 | |
| KR | 101672997 | B1 * | 11/2016 | .............. E04H 12/08 |
| KR | 20210017358 | A * | 2/2021 | ................ E02D 5/54 |
| KR | 102265384 | B1 * | 6/2021 | .............. E02D 27/42 |
| KR | 20210077226 | A * | 6/2021 | ............ F24S 25/617 |
| WO | 20140038568 | A1 | 3/2014 | |
| WO | WO-2019246165 | A1 * | 12/2019 | |
| WO | 2021055619 | A1 | 3/2021 | |
| WO | WO-2021160517 | A1 * | 8/2021 | ............. E02B 3/126 |
| WO | WO-2021195313 | A1 * | 9/2021 | ........... H01L 31/042 |
| WO | 2022226268 | A1 | 10/2022 | |

OTHER PUBLICATIONS

S. Jianxia, "Hydro Power" 2012, pp. 1-11.

European Patent Office, International Search Report, PCT/US24/038268 (Dec. 23, 2024).

European Patent Office, Written Opinion of the International Searching Authority, PCT/US24/038268 (Dec. 23, 2024).

* cited by examiner

ANCHORING STRUCTURE FOR GROUND MOUNTING OF SOLAR PHOTOVOLTAIC SYSTEM

TECHNICAL FIELD

The present invention relates to solar photovoltaic energy generation systems having a plurality of solar photovoltaic modules or panels attached to supports on a surface. More particularly, the present invention relates to an anchoring structure for mounting of the plurality of solar photovoltaic modules of the energy generation system.

BACKGROUND OF THE INVENTION

One of the most crucial, difficult, time-consuming and expensive tasks of building ground mount utility scale solar arrays, is anchoring the system to the ground so it will not move, sink or brake during high winds, rain, snow events and seasonal change of the ground. Even more difficult challenge is how to anchor these systems in places with expansive soils, of high shrink-swell capacity factor, soils which tend to move, shrink or swell. In such occasions, very heavy and expensive anchoring foundations are required.

The present invention provides a novel technology for anchoring solar photovoltaic structures on sloped or flat grounds. The anchoring structure comprise of only three components, cost effective to make and simple and fast to install. The anchoring system is also lightweight and semi-flexible. Finally, this solution is highly robust, easy to maintain and to fix in case need.

Relevant applications of the invention, involve assembly of solar systems on the outer side slopes of water reservoir banks, landfills, sloped ground at sides of highway roads, railway lines, embankments, berms and such other man-made ground structures.

Accordingly, there is a need in the art for an improved anchoring structure for surface mounting of the plurality of solar photovoltaic modules. It is to such that the present invention is directed.

SUMMARY OF THE INVENTION

The present invention meets the need in the art by providing an anchoring system and a direct mounting method for solar photovoltaic system based on an earth anchoring using soil nails or soil fasteners (also known as ground nails or earth anchors), an exposed geomembrane liner, and a structural tie-up racks.

More particularly, the present invention provides a ground mounting system for mounting solar photovoltaic panels on a sloped surface of a greenfield comprising:
(a) an array of a plurality of soil fasteners, each soil fastener for inserting into ground of a greenfield in spaced relation;
(b) a plurality of resilient washers each for seating on a respective one of the soil fasteners;
(c) a plurality of cover washers each for seating on a respective one of the resilient washers;
(d) a plurality of adapting regulating apparatus, each for securing to a respective soil fastener; and
(e) a plurality of elongated racks for connecting to a respective adapting regulating apparatus and for receiving and supporting solar photovoltaic modules, said adapting regulating apparatus configured for adjusting a connection of said respective elongated rack for positioning said received solar photovoltaic module selectively between a first height and a second height relative to the ground, said first height lower than said second height, for resisting wind uplift forces on the field of solar photovoltaic modules while said solar photovoltaic modules generate electrical current upon exposure to ambient light.

In another aspect, the present invention provides a method for mounting solar photovoltaic panels to a greenfield site, comprising the steps:
laying a covering layer on a greenfield ground surface;
inserting a plurality of soil fasteners through said covering layer inwardly into the greenfield ground in spaced relation as an array of spaced-apart soil fasteners;
seating a resilient washer on the soil fastener in contact with an upper surface of the covering layer;
seating a cover washer on the resilient washer;
installing one of a plurality of regulating apparatus for interconnecting each respective soil fastener to a respective rail of a plurality of rails;
mounting a plurality of solar photovoltaic panels to the rails; and
adjusting the connection of a respective regulating apparatus to the respective rail for positioning said mounted solar photovoltaic panel selectively between a first height and a second height relative to the greenfield ground surface, said first height lower than said second height,
whereby the soil fasteners support the solar photovoltaic panels for generating energy while resisting wind uplift loading.

In yet another aspect, the present invention provides a utility-scale ground mounting system for mounting solar photovoltaic panels on sloped ground, comprising:
(a) a geomembrane, for covering a sloped ground;
(b) a plurality of soil fasteners for embedding in spaced relation as an array in the sloped ground, wherein each one of said soil fasteners comprising an elongated rod for embedding in the sloped ground for communicating loading thereto;
(c) a plurality of resilient washers each for seating on a respective one of the soil fasteners;
(d) a plurality of cover washers each for seating on a respective one of the resilient washers;
(e) a plurality of regulating apparatuses, each regulating apparatus attached to a respective soil fastener; and
(f) a plurality of solar photovoltaic panels and a plurality of supporting racks, respectively coupled by the regulating apparatus with said array of soil, said regulating apparatus adjustable for attaching a respective one of the plurality of solar photovoltaic panels selectively between a first height and a second height relative to the geomembrane for generating energy upon exposure to ambident light, said first height lower than said second height,
wherein the mounted solar photovoltaic panels have bottoms 5-50 cm away from the geomembrane;
the elongated rod of the soil fastener has a diameter ranging between 5 mm to 30 mm, and
said geomembrane has a thickness ranging from 0.5 mm to 3 mm.

In another aspect, the present invention provides a method of securing a geomembrane overlying a ground site, comprising the steps of:
driving a soil fastener through a geomembrane overlying a ground site in the ground;
seating a resilient washer on the soil fastener in contact with an upper surface of the geomembrane;

seating a cover washer on the resilient washer;
attaching a clamp engagedly to the soil fastener for securing the adjacent resilient washer and cover washer against the geomembrane,
whereby the engaged resilient washer and cover washer restrict the soil fastener from sinking into the ground under periodically occurring wet ground and precipitation load on solar photovoltaic modules supported by the soil fastener while holding said geomembrane in overlying relation to a ground surface, restricting infiltration of ambient environment water into the ground via an opening through which the soil fastener extends while restricting vegetation growth therethrough to reduce site maintenance requirements.

Objects, advantages, and features of the present invention will become apparent upon a reading of the following detailed description in conjunction with the drawings

BRIEF DESCRIPTION OF THE DRAWINGS

FIG. 1 illustrates typical geomembrane 100 including holes (designated as openings 103) in a predesign location. The holes 103 are aligned in a grid spaced W distance apart on respective lines for orienting support rails and spaced L laterally apart to space the rails to which the solar photovoltaic modules attach in vertically spaced relation to the geomembrane. As discussed below, FIG. 1 further illustrates cross-slits 105 for facilitating installation of a soil fastener 200 discussed below in reference to an embodiment illustrated in FIGS. 7 and 8.

DETAILED DESCRIPTION

The system's three main components are: soil nails or ground fasteners with interconnection joint, geomembrane liner which cover the ground and tie-up racks. A typical usage of the innovation, involve soil nails that are being inserted through a geomembrane layer and are then tied to each other by bolts on nails' top edge. The resulting structure supports racks made of metal or plastic or other structural profiles to which photovoltaic panels can be mounted.

The invention is suitable for most soil type including expansive soils. Preferred soil type is filling soft soil which is used typically in banks of water reservoir, landfill or roads side banks and embankments.

Anchoring structure components: our system comprise three main components, working together to enhance anchoring effect and robustness:

Soil nails are intended to enable direct mounting of PV panels to the below ground or other surface. Nails may be of any shape (rod, threaded rod etc.), size or material (metal, plastic, etc.). Soil nails should be able to withstand loads on panels such as snow load compression and wind uplift forces. It should be able to serve as base structure for PV panels for at least 25 years. Soil nails also enhance soil stability during service. Preferred ground is soil without large stones or rocks. Nail diameter: 5-30 mm, length 0.5 to 20 meter and can be made, for example, of construction steel coated with protective layer of plastic, steel, or zinc, or any such other material that is strong enough to be inserted to the necessary depth m the ground. Spacing between soil nails depend on the nail design, soil parameters, local building standards for uplift forces, solar field parameters (i.e., slope level, direction, size and shape) and photovoltaic system being installed on the grounding structure. Typical spacing may be 1-6 meters between each two nails. Typical soil nails are intended to support heavy loads and are expensive and demand special tooling to insert. Our system allows the use of very simple soil nail design, which is easy to insert in 1 minute and at a cost of single digit dollar amount.

The system provides a utility-scale solar energy generation installation as an electrical plant or equipment within an electrical generation and distribution system of an electrical utility, which operation as an individual entity would cause a noticeable change in the operation of the electrical utility. For example, a single domestic PV panel, on its own has no discernible effect on the operation of a power network.

Geomembrane: layer is placed to cover the ground beneath the photovoltaics system. The above-mentioned soil nails are inserted through the geomembrane layer and hold it in place. Suitable materials as geomembrane layer are (not a closed list). HDPE, LDPE, LLDPE, HDPP, TPO, reinforced PVC and such other long standing membrane materials with a thickness range (but not limited to) 0.5 to 3 mm. The geomembrane layer covering the ground is aimed to eliminate rain and wind damage to the sloped ground and the soil nails attachment to the ground while also providing additional structural strength to the soil nails, since the geomembrane distributes the forces being put on the soil nails in a very efficient way. This is especially important on sloped grounds. Geomembrane layer also eliminate weeds from growing underneath the solar array. Weed growths may harm the solar field and its maintenance in addition to changing the soil structure and weakening the soil nail attachment to the ground.

Tie-up racks: function as a base to anchor panels and by regulation to maintain the panels at same surface made of metal or plastic or other structural materials in the shape of strips or profiles. The tie-up racks are designed to provide the soil nail extra strength against up-lift wind forces. This is extremely important when used in shallow insertion of soil nail into sloped grounds. Previous mounting solutions depend on single soil nail being able to withstand up-lift forces when stand alone. The uniqueness of current invention relay on the high impact force being created by multiple soil nails working together.

Assembly of PV System

The photovoltaic array is being assembled directly on top of the soil nails using racking profiles (metals or plastic) which are secured by bolts. The photovoltaic modules are assembled to these racks by means of bolts or other fastening means.

Height of panel bottom above ground may be 5-50 cm.

Typical System Assembly Procedure

Stage 1—Clearing the ground surface from any plants, weeds, stones etc.

Stage 2—Placing the geomembrane sheets on the ground and secure the membrane to the ground.

Stage 3—Insertion of soil nail through the geomembrane and into the below ground. Insertion can be done manually or by using electric hammer.

Stage 4—Attaching tie-up racks to soil nails' upper side using bolts (adjust location and height).

Stage 5—Assembling photovoltaic panels to tie-up racks using bolts and fasteners.

Advantages

Our novel anchoring system allow to install photovoltaic arrays in places that are very difficult or not affordable to install—water reservoirs, landfills, side of highways and so on.

Using anchoring system based on soil nails is very cost effective, highly robust, simple to build and maintain and fast to deploy and install.

Most of the parts can be produced locally, therefore saving both money and lead time in procuring all necessary parts.

The geomembrane is a very simple solution, and beside reinforcing the soil nails is also prevents weed growing, and rain, snow and wind damages—all of which are typical to man-made soil based structures like reservoirs and landfills.

The solution is very robust, allow to use many types of solar panels and off-the-shelf parts. Our solution also solves some of the biggest challenges of anchoring photovoltaic arrays on expansive soils like clay and other soil types.

Figure 7:
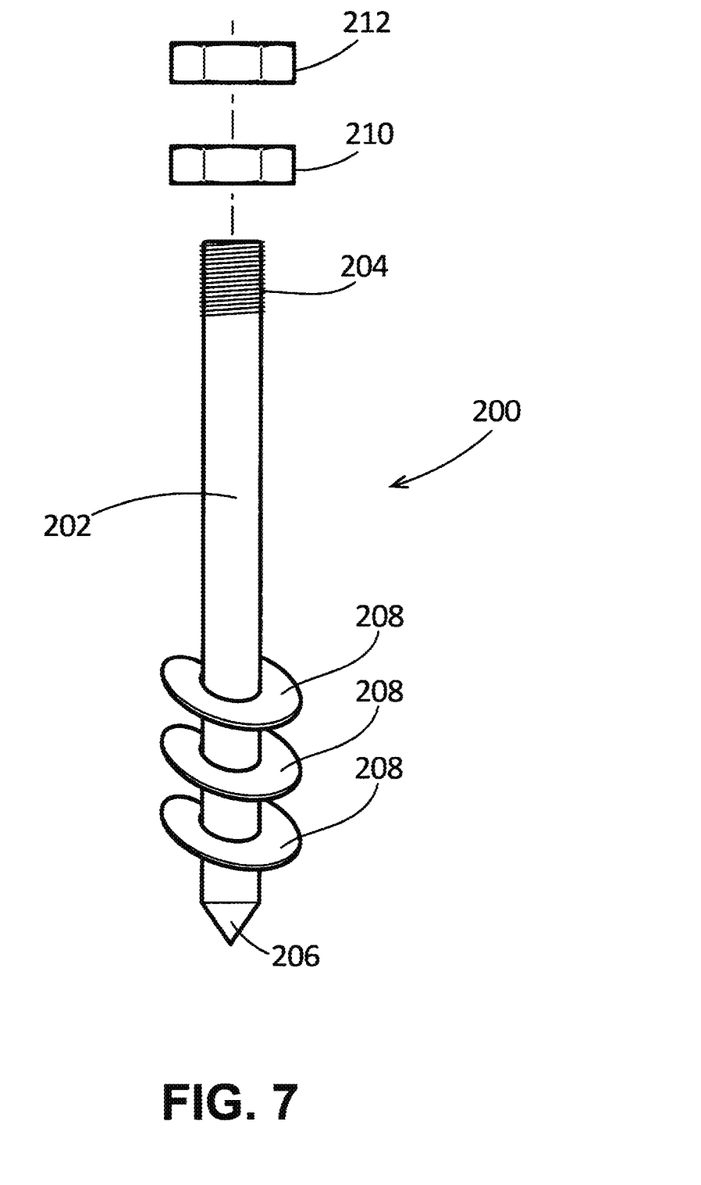
FIG. 7 illustrates a side view of soil fastener for engaging the ground and securing to the rack through the regulation apparatus for supporting the installed solar photovoltaic modules.

While the foregoing discloses soil nails (a simple rod-type nail, headed nail, finned nail), soil conditions may not provide sufficient loading interface. FIG. 7 illustrates a side view of an alternate embodiment soil fastener 200 for engaging the ground 101 and securing to the rack 150 through the regulation apparatus 130 for supporting the installed solar photovoltaic modules 170. The soil fastener 200 includes an elongated shaft 202 having a connector 204 at a first end and a distal tip 206 at an opposing end. One or more helix members 208 attach in spaced-apart relation to the shaft 202, for example as illustrated proximate the distal tip 206. The connector 204 comprises a threaded end for extending through the hole 110 of the washer 120 of the regulating apparatus. The threaded connector receives a seat member 210 and a fastening nut 212.

Figure 8:
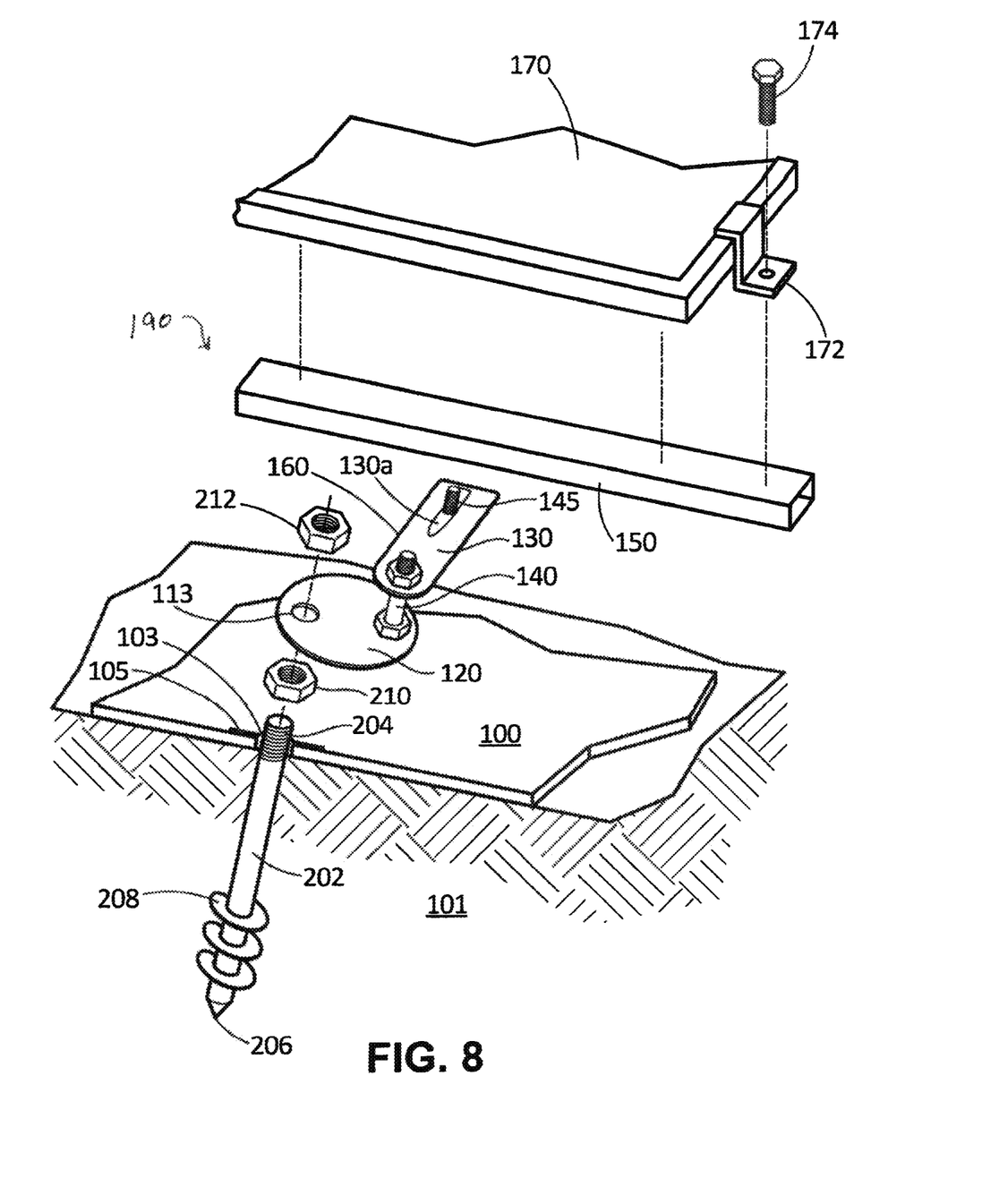
FIG. 8 illustrates in perspective view the soil fastener illustrated in FIG. 7 exploded from the rack, the regulation apparatus, and the solar photovoltaic module for attaching to the rack.

The soil fasteners 200 operate in an alternate embodiment of an energy generation installation 190 of solar photovoltaic modules 170 at a greenfield site. FIG. 8 illustrates in perspective view the soil fastener 200 embedded in the ground 101 of the greenfield site and with one of the regulation apparatus 160, rack 150, and solar photovoltaic module 170 exploded away for illustration purposes. The geomembrane 100 covers the greenfield land site 101 to reduce inflow of ambient environmental water such as from rainfall below the surface. The soil fasteners 200 embed in the ground below and couple to one of the regulation apparatus 160. The racks 150 connect through the regulation apparatus 160. The solar photovoltaic modules 170 secure with connector brackets 172 and fasteners 174 to the racks 150 in vertically spaced-relation over the geomembrane 100.

Figure 9:
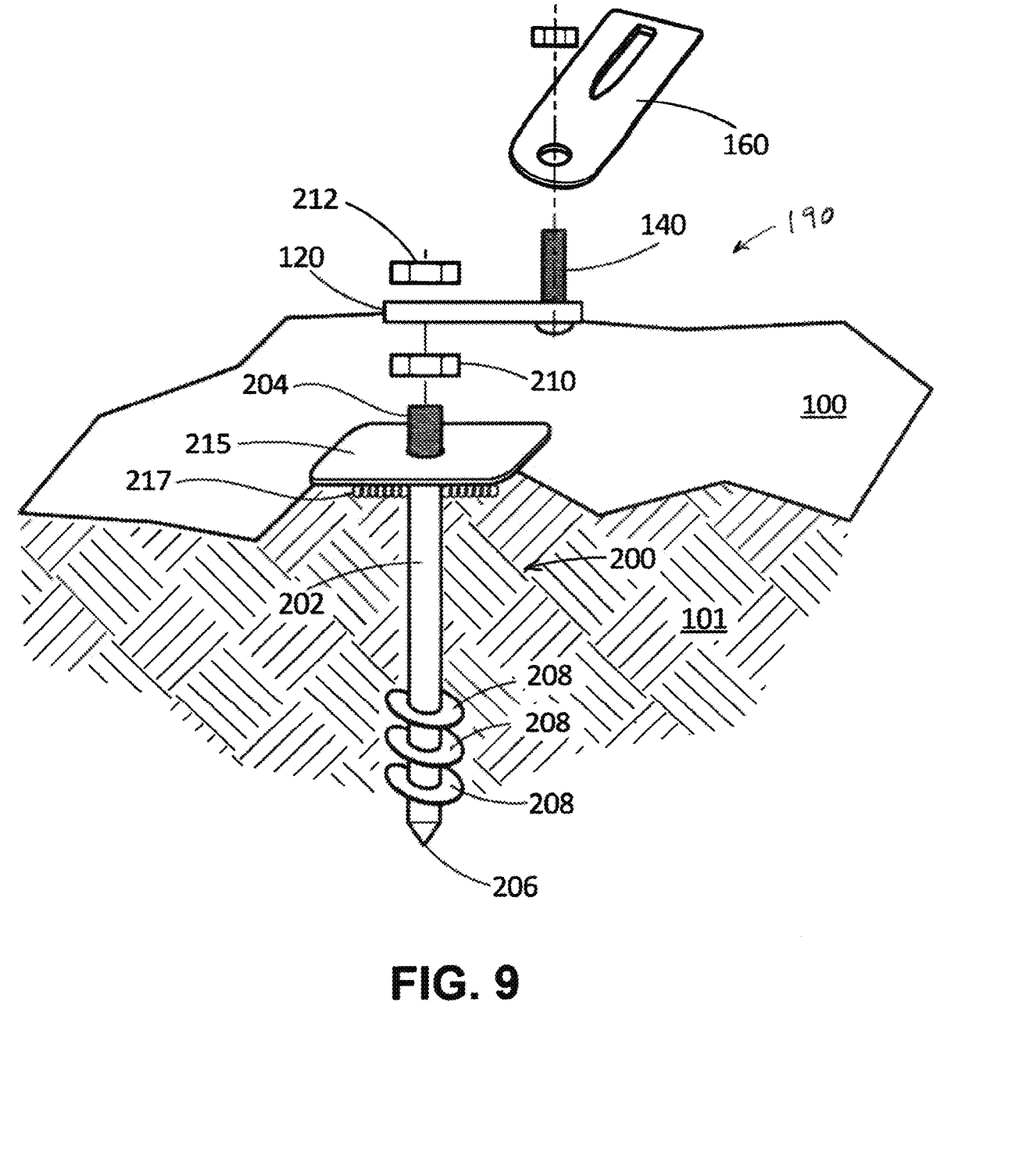
FIG. 9 illustrates an alternate embodiment of a soil fastener for seating onto the geomembrane ground cover.
Figure 10:
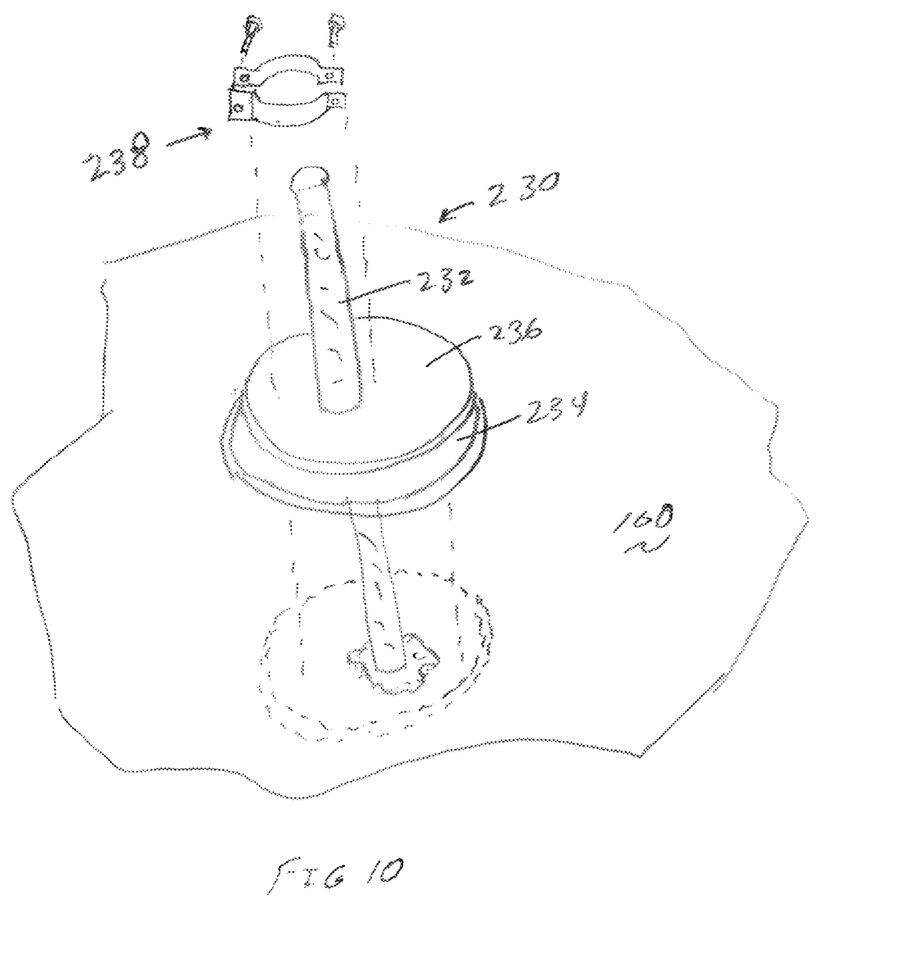
FIG. 10 illustrates in perspective view an alternate embodiment of the soil fastener having first and second plates for seating on the geomembrane.

FIG. 10 illustrates in perspective view an alternate embodiment of the soil fastener 230 having a soil nail 232 and received first and second plates 234, 236 for seating on the geomembrane 100. The soil nail 232 may be an elongated rod such as a length of rebar, or alternatively, a soil fastener shaft having helix members (not illustrated). The first plate 234 preferably comprises a resilient material such as HDPE (or other suitable plastic) for seating in contact with the geomembrane 100. The second plate 236 comprises a metal disk and covers the first plate 234. An upper portion of the soil nail 232 receives the first plate 234 and the second plate 236 that seat against the geomembrane 100 as shown in broken line. A clamp 238 such as a double-ear device clamps to the soil nail 232 to secure the plates 234, 236 fixedly seated on the geomembrane. The illustrated embodiment uses a pair of arcuate members having opposing ears with openings for receiving fasteners. Further, it is to be appreciated that the assembly illustrated in FIGS. 8 and 9 may gainfully employ the first plate 234 for spacing the geomembrane 100 from the washer 120 or the metal plate 215.

Figure 11:
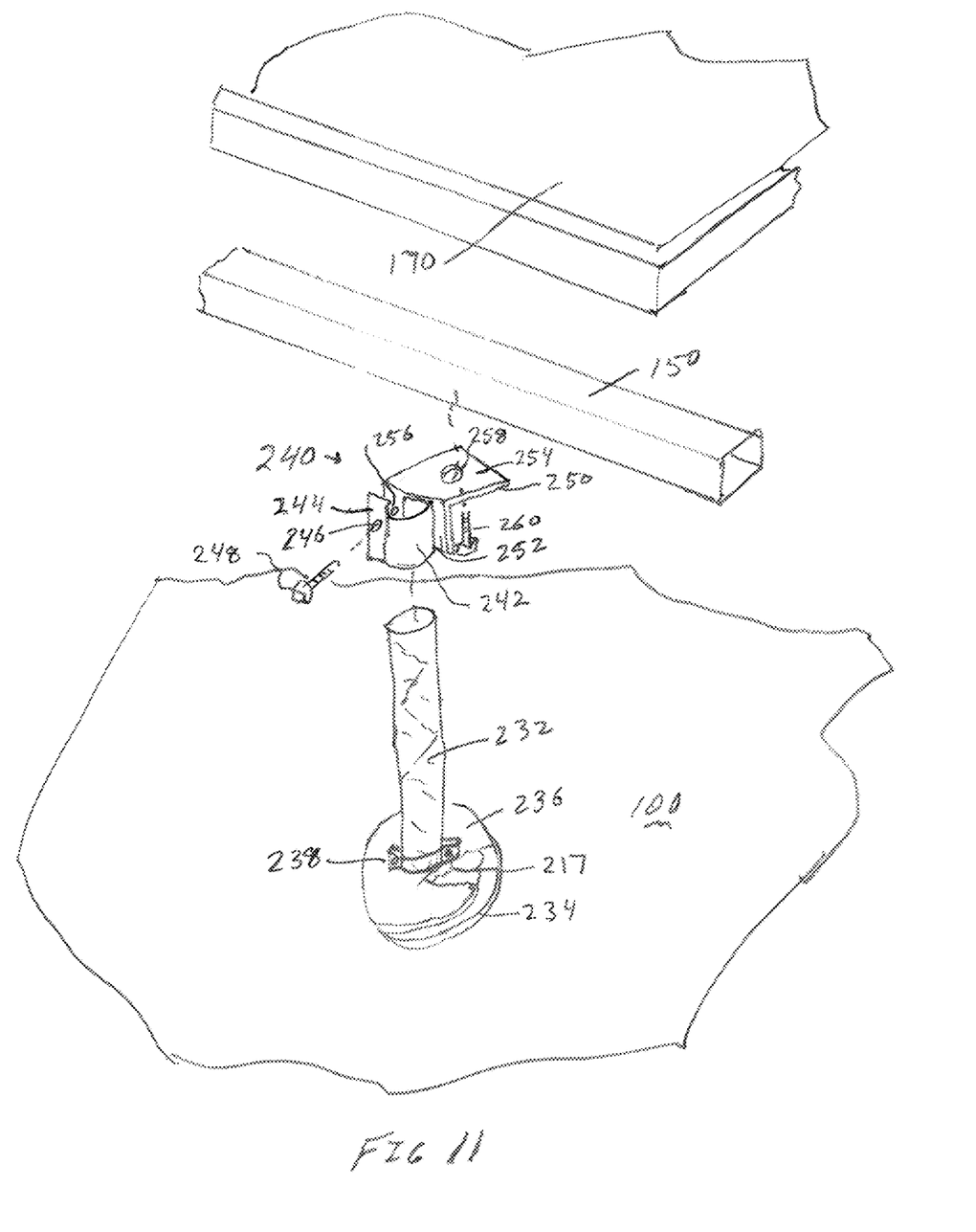
FIG. 11 illustrates in perspective view an alternate embodiment of the regulating apparatus for connecting the soil fastener to a rail for supporting a solar photovoltaic module.

FIG. 11 illustrates in perspective view the soil fastener 230 with an alternate embodiment of a regulating apparatus 240 for connecting the soil fastener to the rail 150 for supporting the solar photovoltaic module 170 (shown exploded away). As shown in cut-away view, the sealant 217 closes the opening for the passage of the soil nail 232 through the geomembrane 100. The HDPE plate 234 seats on the sealant 217 and the geomembrane 100 and the second plate 236 seats on the first plate. The clamp 238 secures the first and second plate 234, 236 in position relative to the soil nail 232. The regulating apparatus 240 comprises an elongated arcuate sleeve 242 with a laterally extending flange plate 244. The flange plate 244 defines an opening 246 for receiving a fastener 248. An L-shaped angle member 250 has an attaching plate 252 and a laterally extending support plate 254. The attaching plate 252 securely attaches such as by welding to the sleeve 242. A lateral portion of the attaching plate 252 defines an opening 256 that aligns with the opening 246. The support plate 254 defines an opening 258 for receiving a fastener 260 for connecting to the rail 150 that seats on the support plate. The rail 150 supports the solar photovoltaic module 170 that attaches with clamps 174 (not illustrated in FIG. 11).

The first plate 234 and the second plate 236 provide a metal material that overlies the plastic washer and secured to the soil nail 232 with the clamp 238. The adjacent plates 234, 236 restrict the soil nail 232 from further sinking into the ground during operative use, for example, in certain conditions of highly wet ground or severe snow load on the supported solar photovoltaic module panels. The plates 234, 236 further hold the geomembrane 100 in fixed overlying relation to the greenfield site. The HDPE washer 234 contacts the geomembrane and thereby provides a seal to restrict or reduce ambient water infiltration below grade into the ground via the nail holes through the geomembrane. The HDPE washer 234 protects the underlying geomembrane 100 from tears that may occur from contact with the metal washer 236. The sealant 217 further cooperates with the plate 234 to effect such sealing from water infiltration. The closing of the opening 103 by the plate 234 (and preferably in combination with the sealant) thereby also prevents or reduces vegetation growth through the opening, which prevention reduces greenfield maintenance in and around the installed energy generation panels.

Figure 1:
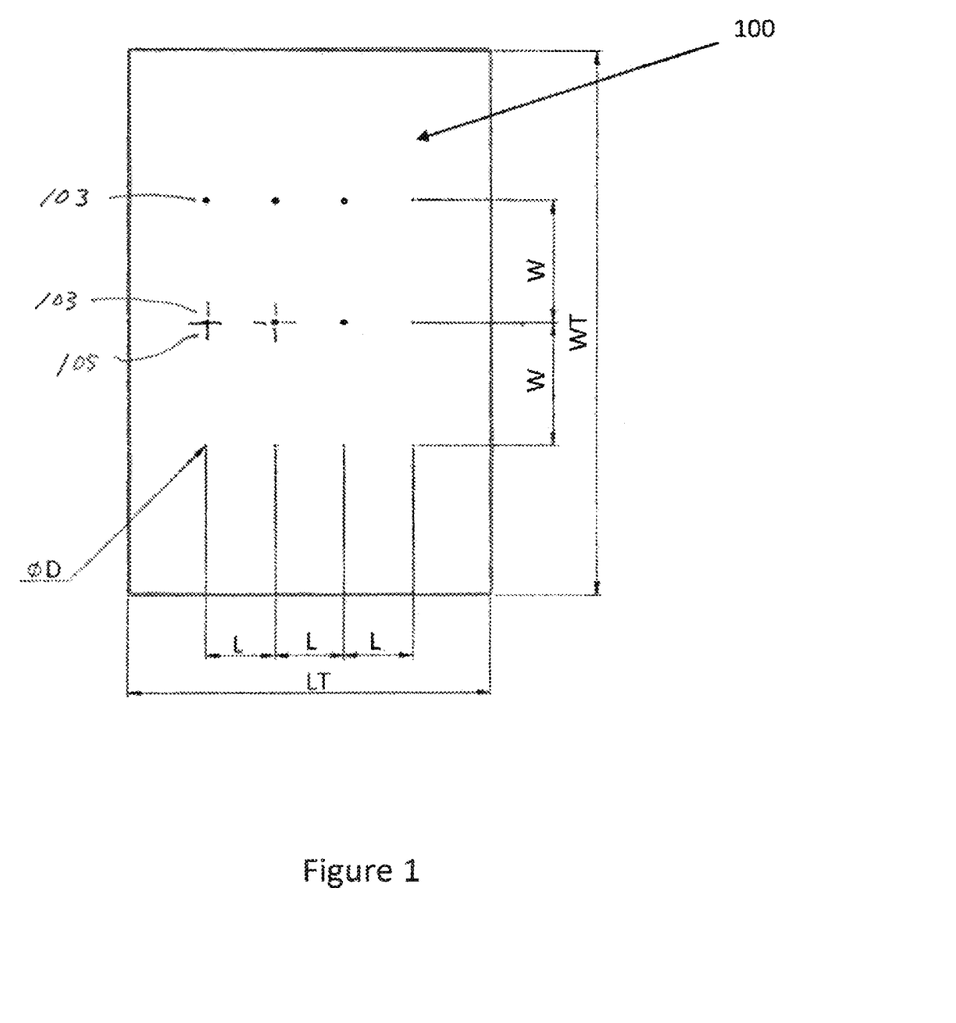
Figure 2:
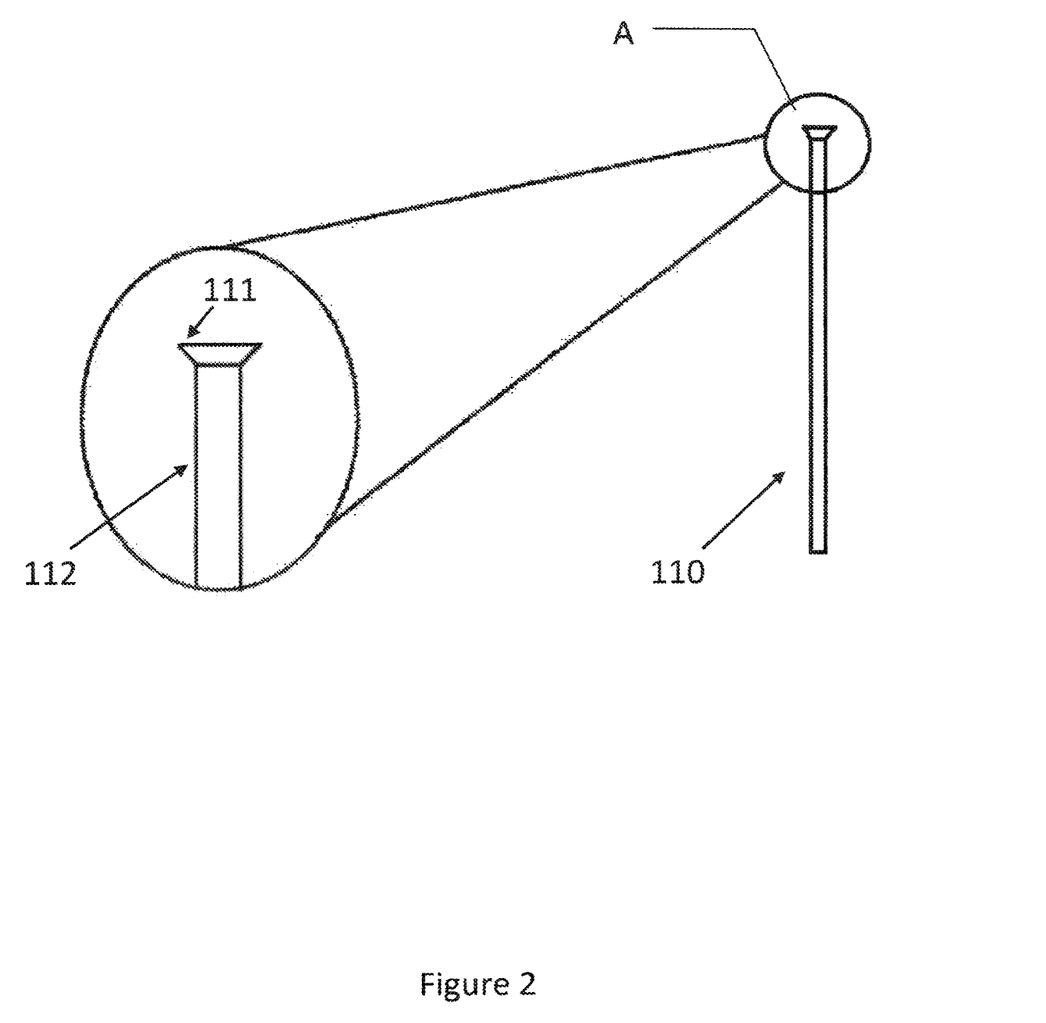
FIG. 2 illustrates a soil nail 110 as a soil fastener, comprised of a rigid rod 112 and a flat head 111, for engaging ground of a greenfield site for supporting solar photovoltaic modules as discussed below.
Figure 3:
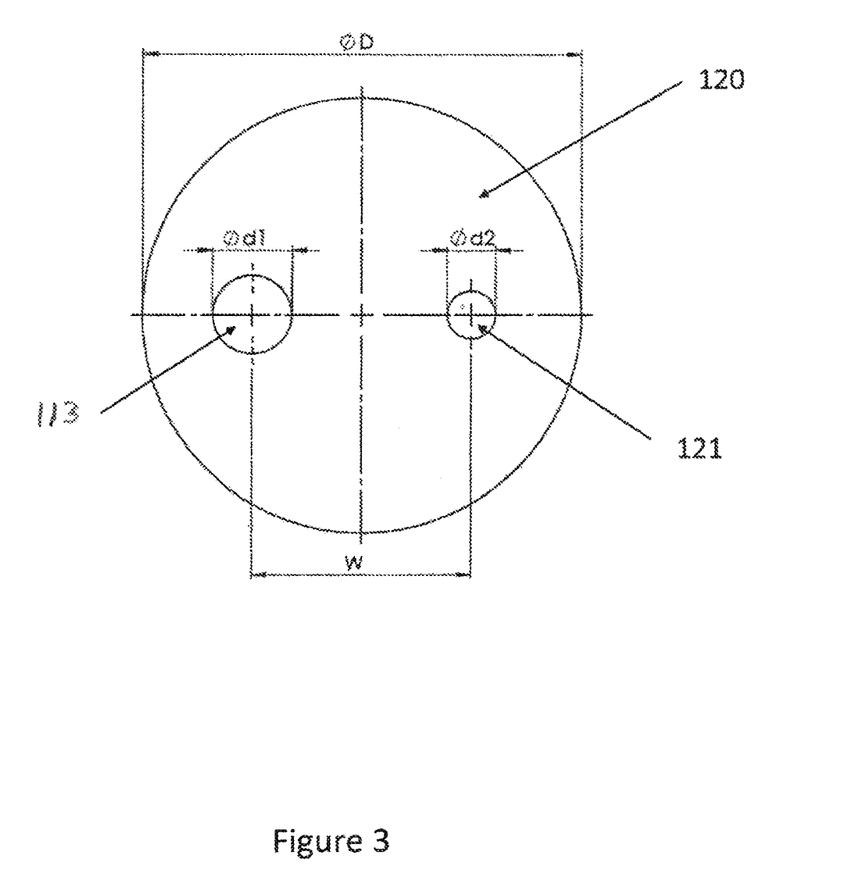
FIG. 3 illustrates a washer 120 that is a connecting disc, and includes one hole 113 for insertion of the soil nail 110 and another hole 121 to assemble a bolt to attach rack on which panels are assembled.

With reference to FIGS. 7 and 8, the energy generation system installation 190 includes the geomembrane 100 that overlies the ground 101. A first plurality of the soil fasteners 200 are positioned spaced apart in a first line. Each soil fastener 200 is driven, such as by a power driver or lever to rotate the soil fastener through the geomembrane 100 and into the ground. The helix members 208 assist by pulling the shaft 202 downwardly. The geomembrane 100 may be pre-cut, such as with crossing slits 105, to allow passage of the helix members through the geomembrane without tearing. The threaded end of the soil fastener 200 receives the seat member 210 and the washer 120, which is secured with the nut 212. With reference to FIG. 1, additional soil fasteners 200 are positioned on a second line in spaced lateral relation to the first. Each line of soil fasteners 200 are attached with the regulating apparatus to respective elongated rails. In an alternate embodiment, the geomembrane is pre-printed with an array of spaced-apart locations 103 for marking spaced lateral L and longitudinal W positions for installation of the soil fasteners 200 and the rails 150 in spaced-apart relation for engaging the greenfield ground and supporting the attached solar photovoltaic modules 170 for generation of energy upon exposure to ambient lighting.

The connector end 204 receives the seat member 210, and extends through the opening 113 of the washer 120 of the regulating apparatus. The nut 212 received on the connector end 204 secures the washer 120 to the soil fastener.

Figure 4:
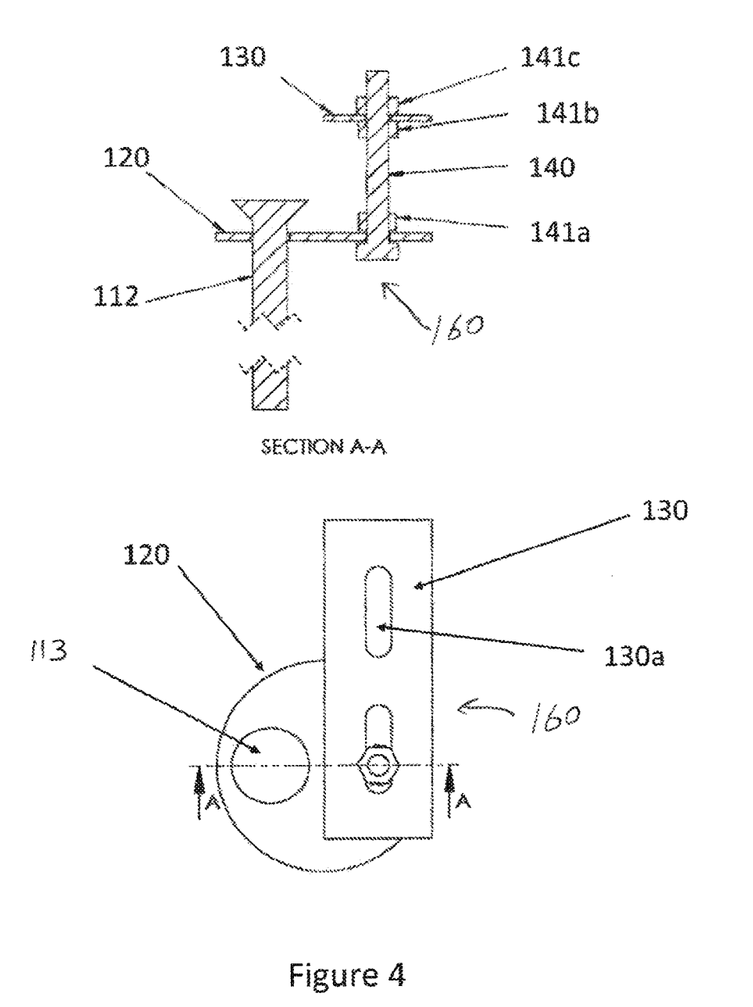
FIG. 4 illustrates a regulation apparatus 160 that is assembly of the washer (the connecting disk) 120 and a connecting arm 130 that has a notched hole 130a and its cross section in which a bolt 140 is fastened with row nuts 141a, b and c. The connecting arm 130 is assembled on the bolt 140 with two nuts 141b, 141c which enables regulate the height of the connecting arm 130.
Figure 5:
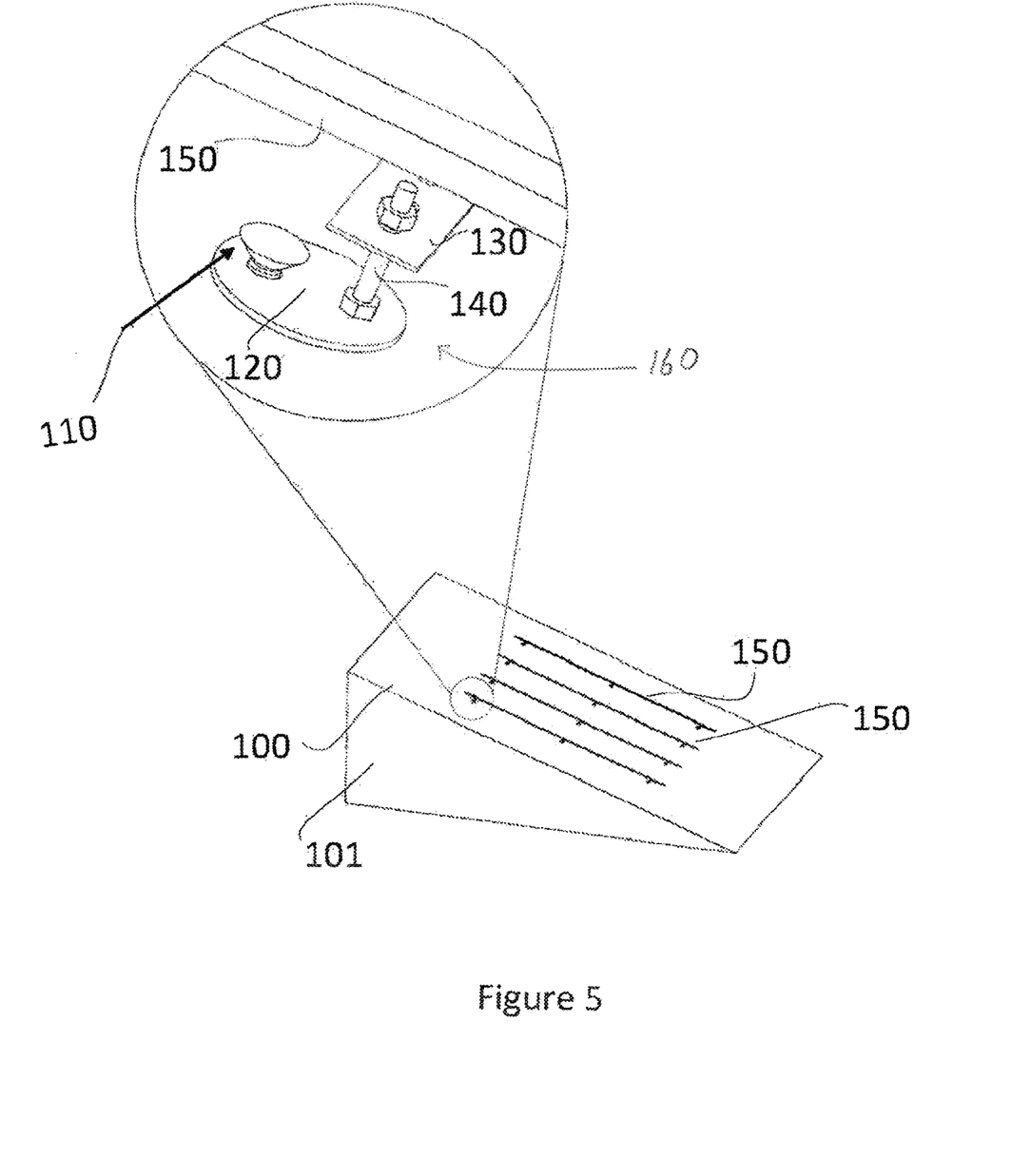
FIG. 5 illustrates a rack 150 that is assembled with a standards fastener to a number of regulation apparatus 160 along the geomembrane 100 that is overlaid on the ground 101. In each connection point there is a washer 120 connected to a respective soil nail 110 with a bolt 140 and flat steel 130, enabling to regulate the racks 150.
Figure 6:
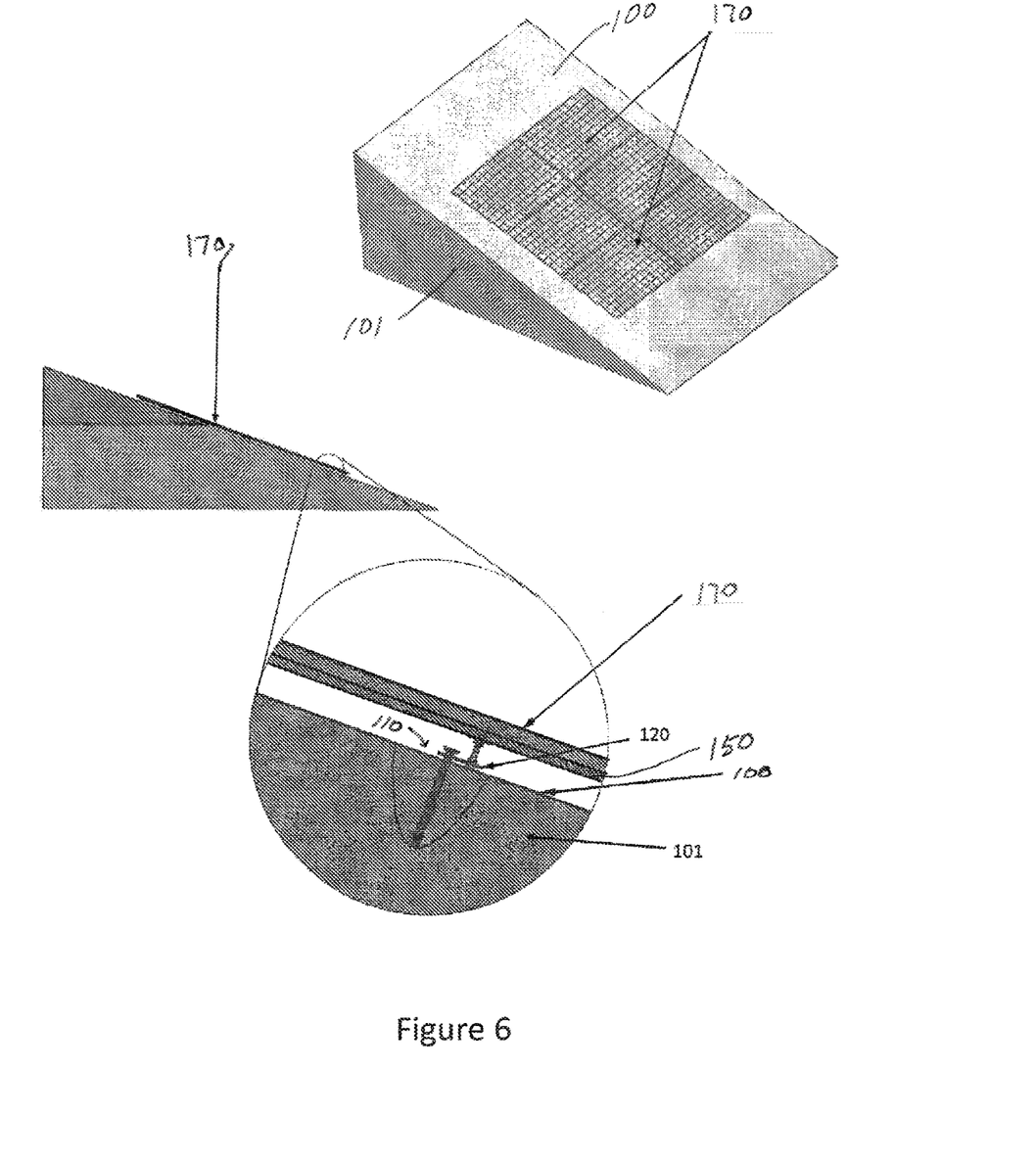
FIG. 6 illustrates the final assembly of the solar panels 170 on racks 150 and regulated by a plurality of regulating apparatus 160 as described in FIG. 4.

The bolt 140 attaches to the other opening in the washer 120 with the nut 141a. The connecting arm 130 secures to the bolt 140 with the nuts 141b and 141c as shown in FIG. 4. The bolt 140 allows vertical positioning of the connecting arm 130.

A fastener 145 secures the connecting arm 130 to the rail 150. This process of assembly of regulating apparatus 160 repeats for each of the soil fasteners 200. One of the solar photovoltaic modules 170 seats on the pair of opposing rails 150 and the connector bracket 172 and fasteners 174 secure the solar photovoltaic module 170 to the rails.

It is to be appreciated that larger diameter helix member 208, multiple helix members, longer length shaft 202, or combination, can be used with the soil fastener 200 to achieve an appropriate load holding capacity or for use in less-dense soil or ground. The soil fastener 200 can made of steel, plastic, or other suitable material.

FIG. 9 illustrates an alternate embodiment of a soil fastener 200 for seating onto the geomembrane ground cover 100. The soil fastener 200 includes a seating plate 215 attached in a distal end portion proximate the connector 204. The seating plate 215 defines a stop to assist installation against the geomembrane 100 and during operational use distribute loading relative to the geomembrane. Further, a sealant 217 may be applied to close the slits 105. In the embodiment of FIG. 9, the sealant adheringly attach the plate 215 to the geomembrane and restricts flow of ambient water into the interconnection of the soil fastener, the geomembrane, and the ground.

The soil fasteners 200 hold the rails and photovoltaic modules securely for exposure to ambient light to generation of electrical energy while also transferring compression forces (rails and photovoltaic mass pushing down on the soil fasteners) to the ground and in some embodiments while resisting tension forces from wind uplift loading on and about the planar photovoltaic modules tends to lift upwardly. The helical members of the soil fasteners 200 function as a pier in supporting the rails and attached photovoltaic modules.

With reference to FIGS. 7 and 8, an embodiment 190 of the disclosed system operates with the three main components: a plurality of the ground fasteners each with an interconnection point, the geomembrane liner that covers the ground surface, and the tie-up racks connected to the ground fasteners through the regulating apparatus at the interconnection point, which racks support the solar photovoltaic modules. A typical usage of the innovation involves soil engaging members such as soil nails and soil fasteners that upon being inserted through the geomembrane layer are then tied to each other through the rails 150 secured by the connecting washer 120 and the connecting arm 130 of the regulating apparatus. The resulting structure supports racks made of metal or plastic or other structural profiles to which photovoltaic panels can be mounted.

With reference to FIGS. 10 and 11, the alternate embodiment soil fastener 230 installs with the soil nail 232 driven through the opening 103 in the geomembrane into the below-grade soil. The sealant 217 closes the opening 103 and the upper end of the soil nail 232 receives the first and second plates 234, 236 seating on the geomembrane 100. The clamp 283 secures the plates on the geomembrane relative to the soil fastener 230. The first plate 234 restricts tearing contact of the geomembrane 100 with the metal second plate 236. One of the regulating apparatus 240 connects to the soil fastener 230. In the illustrated embodiment, the upper end of the soil nail 232 receives the arcuate sleeve 242. The sleeve 242 is secured vertically spaced from the geomembrane with the fastener 248 extending through the aligned openings 244, 256. A rack 150 seats on the laterally extending support plate 254 with the fastener 260. The rack 150 also secures to a linearly spaced second soil fastener 230. Depending on soil conditions and rail lengths, additional soil fasteners may be installed.

A second set of soil fasteners 230 install in laterally spaced relation for supporting a second rack 150, as described above. One of the solar photovoltaic modules 170 seats on the spaced-apart rails 150. The solar photovoltaic module 170 attaches with clamps 174 (not illustrated in FIG. 11).

The foregoing discloses embodiments of utility-scale ground mounting systems for mounting solar photovoltaic panels on sloped ground overlaid by a geomembrane, opaque to light, for covering the sloped ground. A plurality of soil fasteners embed in spaced relation as an array in the sloped ground, wherein each one of said soil fasteners comprising an elongated rod for embedding in the sloped ground for communicating loading thereto. A plurality of regulating apparatuses, each attached respectively to a soil fastener, interconnect the ground support soil fastener to a respective one of a plurality of supporting racks that are configured for attaching a plurality of solar photovoltaic panels for generating energy upon exposure to ambient light. The mounted solar photovoltaic panels have bottoms that are between about 5 cm to about 50 cm away from the geomembrane, but may be spaced higher, for example 75 cm or alternatively angled. The elongated rod of the soil fastener has a diameter ranging between 5 mm to 30 mm. The geomembrane has a thickness ranging from 0.5 mm to 3 mm. Alternatively, at least one helix flight attaches intermediate opposing ends of the elongated rod, preferably proximate the tapered distal end. Alternatively, a plate attaches proximate a driving end of the elongated rod. A sealant may be applied to a bottom surface of the plate for securing the plate to the geomembrane. The sealant further may close the opening made in the geomembrane for passage of the elongated rod into the ground therebelow. The geomembrane may be pre-printed with an array of spaced-apart marks for indicating locations for installation of the respective soil fasteners.

It is to be appreciated that ground support installations in some soil conditions, such as sandy or wet content ground, may benefit from two or more closely spaced soil fasteners of the various disclosed embodiments, for example first and second soil fasteners installed within up to about several feet of each other. In such close proximity ground supports, the soil fasteners may be installed at opposing angles.

The foregoing discloses embodiments of utility-scale ground mounting systems for mounting solar photovoltaic panels vertically spaced from the geomembrane overlying a sloped ground site which mounting systems feature rod and helix members for transferring load to underlying ground while resisting movement and wind uplift. Changes and modifications may be made by those of ordinary skill in the art upon a reading of the foregoing without departing from the subject matter as recited in the appended claims.

What is claimed is:

1. A ground mounting system for mounting solar photovoltaic panels on a sloped surface of a greenfield comprising:
   (a) an array of a plurality of soil fasteners, each soil fastener for inserting into ground of a greenfield in spaced relation;
   (b) a plurality of resilient washers each for seating on a respective one of the soil fasteners;
   (c) a plurality of cover washers each for seating on a respective one of the resilient washers;
   (d) a plurality of adapting regulating apparatus, each for securing to a respective soil fastener; and
   (e) a plurality of elongated racks, each for connecting to a respective adapting regulating apparatus and for receiving and supporting solar photovoltaic modules, said adapting regulating apparatus configured for adjusting a connection of said respective elongated rack for positioning said received solar photovoltaic module selectively between a first height and a second height relative to the ground, said first height lower than said second height, for resisting wind uplift forces on the solar photovoltaic modules while said solar photovoltaic modules generate electrical current upon exposure to ambient light.

2. The ground mounting system of claim 1, further includes a covering layer, for covering the ground, wherein said covering layer has an array of holes and wherein said soil fasteners are inserted into the ground via said holes.

3. The ground mounting system of claim 2, wherein said covering layer is a geomembrane layer.

4. The ground mounting system of claim 1, wherein each soil fastener further comprises a helical flight proximate a first distal end.

5. The ground mounting system of claim 1, wherein the covering layer is printed with a plurality of marks for indicating a respective location for inserting a respective one of the soil fasteners.

6. The ground mounting system of claim 1, wherein the regulating apparatus comprises an annular sleeve received by the soil fastener vertically spaced from the geomembrane, said annular sleeve having a laterally extending support plate to which a rail connects for supporting a solar photovoltaic module.

7. The ground mounting system of claim 1, wherein the regulating apparatus comprises a threaded member that receives a pair of nuts thereon for adjusting the connection of to the respective rail.

8. A method for mounting solar photovoltaic panels to a greenfield site, comprising the steps of:
   laying a covering layer on a greenfield ground surface;
   inserting a plurality of soil fasteners through said covering layer inwardly into the greenfield ground in spaced relation as an array of spaced-apart soil fasteners;
   seating a resilient washer on the soil fastener in contact with an upper surface of the covering layer;
   seating a cover washer on the resilient washer;
   installing one of a plurality of regulating apparatus for interconnecting each respective soil fastener to a respective rail of a plurality of rails;
   mounting a plurality of solar photovoltaic panels to the rails; and
   adjusting the connection of a respective regulating apparatus to the respective rail for positioning said mounted solar photovoltaic panel selectively between a first height and a second height relative to the greenfield ground surface, said first height lower than said second height,
   whereby the soil fasteners support the solar photovoltaic panels for generating energy while resisting wind uplift loading.

9. The method of claim 8, wherein the covering layer comprises a geomembrane.

10. The method of claim 8, further comprising the step of printing an array of marks in spaced relation on the covering layer for indicating respective locations for installation of a respective one of the soil fasteners.

11. The method of claim 10, further comprising the step of punching holes in said covering layer in respective predefined locations indicated by the printed array of marks, and said soil fasteners being inserted through the holes into the greenfield ground.

12. The method of claim 8, wherein the step of adjusting comprises selectively positioning a pair of nuts on a threaded member extending from the regulating apparatus for positioning the mounted solar photovoltaic panel at a selected height.

13. A utility-scale ground mounting system for mounting solar photovoltaic panels on sloped ground, comprising:
   (a) a geomembrane, for covering a sloped ground;
   (b) a plurality of soil fasteners for embedding in spaced relation as an array in the sloped ground, wherein each one of said soil fasteners comprising an elongated rod for embedding in the sloped ground for communicating loading thereto;
   (c) a plurality of resilient washers each for seating on a respective one of the soil fasteners;
   (d) a plurality of cover washers each for seating on a respective one of the resilient washers;
   (e) a plurality of regulating apparatuses, each regulating apparatus for attaching to a respective soil fastener; and (f) a plurality of solar photovoltaic panels and a plurality of supporting racks, respectively coupled by the regulating apparatus with said array of soil fasteners, said regulating apparatus adjustable for attaching a respective one of the plurality of solar photovoltaic panels selectively between a first height and a second height relative to the geomembrane for generating energy upon exposure to ambident light, said first height lower than said second height, wherein the mounted solar photovoltaic panels have bottoms 5-50 cm away from the geomembrane, and wherein the elongated rod of the soil fastener has a diameter ranging between 5 mm to 30 mm, and wherein said geomembrane has a thickness ranging from 0.5 mm to 3 mm.

14. The utility-scale ground mounting system as recited in claim 13, wherein each said elongated rod further comprising at least one helix flight attached to the elongated rod intermediate opposing ends thereof.

15. The utility-scale ground mounting system as recited in claim 13, further comprising a plate attached proximate a driving end of the elongated rod.

16. The utility-scale ground mounting system as recited in claim 13, further comprising a sealant for applying to the geomembrane proximate an opening through which the respective elongated rod passes into the sloped ground.

17. The utility-scale ground mounting system as recited in claim 13, wherein the geomembrane is pre-printed with an array of spaced-apart hole locations for marking locations for installation of the respective soil fasteners.

18. The utility-scale ground mounting system as recited in claim 13, wherein the regulating apparatus comprises an annular sleeve received by the soil fastener vertically spaced from the geomembrane, said annular sleeve having a laterally extending support plate to which a rail connects for supporting a solar photovoltaic module.

19. The utility-scale ground mounting system of claim 13, wherein the regulating apparatus comprises a threaded member that receives a pair of nuts thereon for adjusting the attachment of the solar photovoltaic panel at a selected height.

20. A method of securing a geomembrane overlying a ground site, comprising the steps of:

driving a soil fastener through a geomembrane overlying a ground site in the ground;

seating a resilient washer on the soil fastener in contact with an upper surface of the geomembrane;

seating a cover washer on the resilient washer;

attaching a clamp engagedly to the soil fastener for securing the adjacent resilient washer and cover washer against the geomembrane, whereby the engaged resilient washer and cover washer restrict the soil fastener from sinking into the ground under periodically occurring wet ground and precipitation load on solar photovoltaic modules supported by the soil fastener while holding said geomembrane in overlying relation to a ground surface, restricting infiltration of ambient environment water into the ground via an opening through which the soil fastener extends while restricting vegetation growth therethrough to reduce site maintenance requirements.

21. The method as recited in claim 20 further comprising the step of attaching a regulating apparatus to a portion of the soil fastener spaced from the clamp a predetermined distance for connecting to a rail to support a solar photovoltaic module spaced vertically from the geomembrane; and adjusting the connection of a respective regulating apparatus to the respective rail for positioning said mounted solar photovoltaic module selectively between a first height and a second height relative to the geomembrane, said first height lower than said second height.

22. The method as recited in claim 21, further comprising the steps of connecting a rail to the regulating apparatus and attaching a solar photovoltaic module to the rail in vertically spaced relation to the geomembrane, whereby loading forces transfer from the supported solar photovoltaic module through the regulating apparatus and the soil fastener to the ground while resisting wind.

23. The method as recited in claim 21, wherein connecting the regulating apparatus comprises the steps of securing an annular sleeve received by the soil fastener vertically spaced from the geomembrane, said annular sleeve having a laterally extending support plate to which the rail connects for supporting the solar photovoltaic module.

24. The method as recited in claim 20, further comprising the step of applying a sealant to seal an opening in the geomembrane through which the soil fastener extends.

25. The method of claim 21, wherein the step of adjusting comprises selectively positioning a pair of nuts on a threaded member extending from the regulating apparatus for positioning the mounted solar photovoltaic module at a selected height.

\* \* \* \* \*